United States Patent
Magrab et al.

[11] Patent Number: 5,127,354
[45] Date of Patent: Jul. 7, 1992

[54] ENERGY ABSORBING SYSTEM

[75] Inventors: Edward B. Magrab, Bethesda; Boris L. Krayterman, deceased, late of Rockville, by Irina Krayterman, executortrix; John T. Day, Westminster; Eugene F. Kane, Baltimore, all of Md.

[73] Assignees: University of Maryland at College Park, College Park; Rubber Millers, Inc., Baltimore, both of Md.

[21] Appl. No.: 665,319

[22] Filed: Mar. 6, 1991

[51] Int. Cl.$^5$ .............................................. B63B 59/02
[52] U.S. Cl. ..................................... 114/219; 405/215
[58] Field of Search ................ 114/219, 220; 405/212, 405/213, 215

[56] References Cited

U.S. PATENT DOCUMENTS

| | | |
|---|---|---|
| 2,413,210 | 12/1946 | Blackman ............................ 114/219 |
| 3,600,896 | 8/1971 | Takeisi et al. . |
| 3,784,181 | 1/1974 | Nemec . |
| 3,863,589 | 2/1975 | Guienne et al. ...................... 114/219 |
| 3,999,497 | 12/1976 | Hamel . |
| 4,258,641 | 3/1981 | Wakamiya .......................... 114/219 |
| 4,355,792 | 10/1982 | Fukuda et al. ....................... 114/219 |
| 4,554,882 | 11/1985 | Lemmens . |
| 4,566,678 | 1/1986 | Anderson . |

FOREIGN PATENT DOCUMENTS 56-100914 8/1981 Japan .
63-219715 9/1988 Japan .

OTHER PUBLICATIONS

"Report of the International Commission for Improving the Design of Fender Systems", article entitled Fender Design Enquiry.

*Primary Examiner*—Jesus D. Sotelo
*Assistant Examiner*—Stephen P. Avila

[57] ABSTRACT

An energy absorbing system utilizes a buckling design to absorb a large amount of energy for a given compressive force. This system includes a stack of elastic, thin-walled barrels which are generally aligned along a common longitudinal axis. Between each barrel, an annular plate is provided. Deformation limiters can be mounted on these plates to limit the amount of buckling for each barrel. The enerby absorbing system can be attached to a quay in order to fender a ship.

18 Claims, 4 Drawing Sheets

ENERGY ABSORBING SYSTEM

BACKGROUND OF THE INVENTION

1. Field of the Invention

The present invention relates to an energy absorbing system using a plurality of thin walled barrels generally aligned along a common longitudinal axis. The barrels are made from urethane and have annular plates therebetween. When a force is exerted against an end of the stack of barrels, individual barrels will selectively buckle to thereby absorb this force. This invention is particularly useful in ship fendering systems.

2. Description of the Background Art

Various energy absorbing systems are known in the art. However, known energy absorbing systems for fendering ships primarily rely on bending rather than buckling principles. The walls of these energy absorbing systems are relatively thick. A large thickness is used for the post bending compression when the walls interact. Therefore, when using an expensive material such as urethane, it is rather costly to manufacture these systems. Accordingly, a need in the art exists for a more efficient energy absorbing system, which is relatively thin walled. Such a system is one that employs buckling.

SUMMARY OF THE INVENTION

Accordingly, it is a primary object of the present invention to provide an energy absorbing system which utilizes the principles of buckling.

It is another object of the present invention to provide an energy absorbing system which is relatively thin walled.

It is a further object of the present invention to provide an energy absorbing system which can effectively fender a ship or other structure without causing damage thereto.

It is still a further object of the present invention to provide an energy absorbing system which uses a minimum volume of material in order to keep manufacturing costs low.

It is yet another object of the present invention to provide an energy absorbing system which is easy to manufacture, which is highly reliable and which requires limited maintenance.

These and other objects of the present invention are fulfilled by providing an energy absorbing system comprising buckling means. The buckling means includes a stack of elastic, thin walled barrels aligned along a common longitudinal axis. One end of the stack is positioned on a fixed object while the second end will receive a force such as that generated upon impact of a docking ship. Upon receiving this force, the weakest barrel or barrels of the plurality of barrels will buckle. Further application of the force causes this buckling to absorb all or almost all of the force. After that amount of force has been absorbed by the buckled barrel(s), another barrel(s) of the stack will begin buckling if a force increment occurs. After this second barrel(s) is buckled, another barrel(s) will begin buckling and so forth. In this manner, the barrels will individually buckle in order to absorb the total force.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
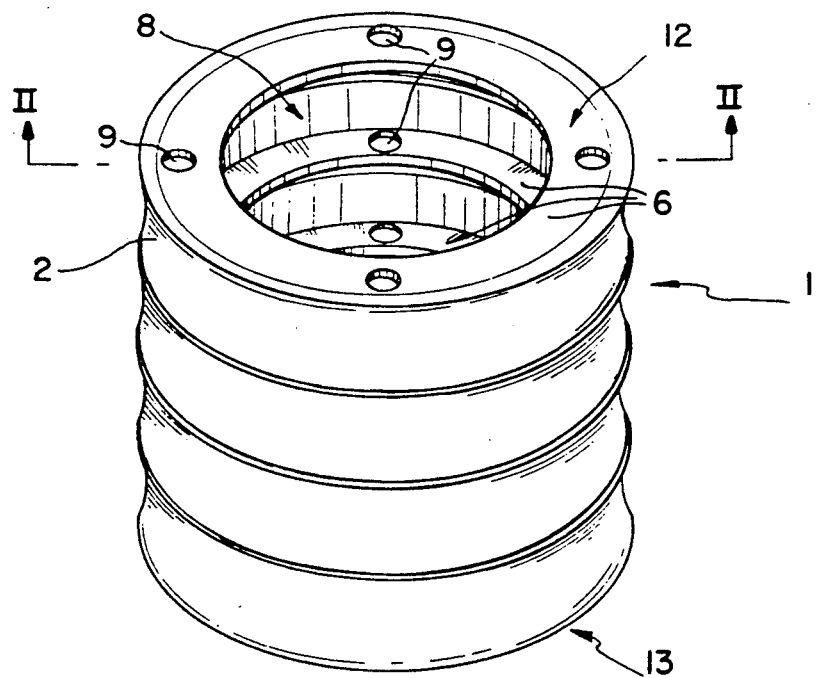
FIG. 1 is a perspective view of a first embodiment of the energy absorbing system of the present invention.

Referring in detail to the drawings and with particular reference to FIG. 1, an energy absorbing system 1 is shown. This system 1 includes a stack of individual barrels 2. These barrels 2 can have various configurations as will be discussed in more detail below.

Figure 2:
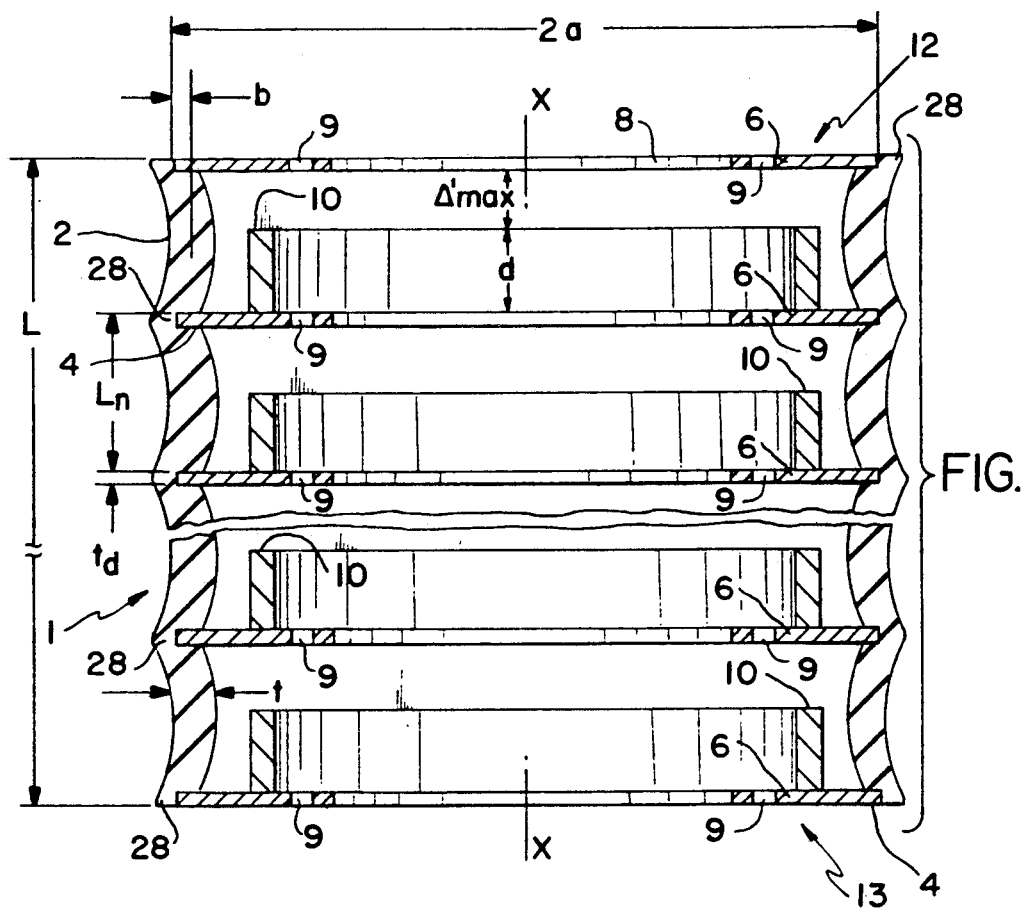
FIG. 2 is a side, cross-sectional view of the first embodiment taken along line II—II in FIG. 1 of the energy absorbing system of the present invention.

As seen in FIG. 2, the system 1 includes a stack of barrels 2. A recess 4 is provided for receiving an annular plate 6 between each barrel 2. An optional opening 8 is provided in the center of this annular plate. This opening 8 can be omitted and a solid plate or a plate having only bores 9 can be used if so desired. This opening 8 as well as the plurality of barrels 2 are generally centered around a common longitudinal axes X.

In FIG. 1, the uppermost plate 6 is shown with four bores 9. These bores 9 can extend through all the plates 6 and are used to hold plates 6 in position during manufacture of the system 1. The stack of barrels 2 can be cast from urethane while the annular plates 6 are held in position by rods inserted through bores 9. While only four bores are shown in the uppermost plate 6, it should be recognized that any number of bores in all of the plates 6 could be used. Moreover, the system 1 of the instant invention can be manufactured from techniques other than casting.

At each end of the stack of barrels 2, an annular plate 6 is provided. Because these end annular plates 6 are positioned within a recess 4 and are sufficiently embedded in a portion of urethane material 28 forming the barrels 2, these end plates 6 are rigidly held in position by the system 1.

It should be understood that while annular plates 6 are shown between each of the barrels 2, other arrangements could be used. For instance, a plate having a plurality of holes punched therein could be used. Similarly, the plates at the ends 12, 13 of the stack of barrels 2 can vary from the other types of plates used.

In the system 1, a deformation limiter means 10 is provided on all but the uppermost annular plate 6. This deformation limiter means 10 comprises a ring positioned inwardly from the side of each barrel 2 on the annular plate 6. As will be discussed in more detail below, when a force is applied to the top of the system 1, the individual barrels 2 will buckle causing the annular plates 6 to contact the deformation limiter means 10. This deformation limiter means 10 prevents further buckling of the barrels 2 and causes subsequent barrels to buckle. By limiting the amount of buckling of each barrel, damage to the barrels is avoided due to rollup, tearing and excessive stress.

The deformation limiter means 10 can be spaced detents rather than a continuous, circular ring. However, the continuous ring configuration has the advantage of uniformly distributing force around the annular plate 6, thus avoiding forces which tend to bend the annular plate 6. Nonetheless, any suitable shape and configuration can be used for the deformation limiter means 10.

While the deformation limiter means 10 are shown attached to all but the top annular plates 6, the system 1 can be inverted such that the deformation limiter means 10 are on all but the bottom of the annular plates 6. Alternatively, each side of the annular plate 6 can have a deformation limiter means 10 and only every other plate 6 will carry these limiters. There merely needs to be a space between one of the deformation limiter means and another object which is to be contacted during buckling of the barrel 2 in order to accommodate deformation of the barrel.

For each barrel 2, the preferred material is 100 percent urethane. Various types of urethane compositions can be used. The use of urethane has several advantages when compared to conventional rubbers and plastics. Urethane is a thermosetting material characterized by unusual toughness. It combines resilience and high bearing load capacity with resistance to impact, abrasion, compression, and degradation by oxygen and oil. In addition to its unique properties, urethane is a liquid polymer that is mixed with a curing agent and, therefore, can be fabricated by casting. One major reason for choosing urethane is that with these materials there is almost complete recovery of its geometric and elastic properties after the release of the forces of deformation, even when subject to very large strains (25-100%, and larger). Further, the elastic properties of urethane can be "adjusted" to be much stronger than natural rubber, thereby providing more energy absorption.

However, due to the relatively high cost of urethane, it is desirable to keep the wall of each barrel 2 relatively thin. In this manner, the amount of urethane (and therefore the cost of the system) is kept low.

A first embodiment of the energy absorbing system is shown in FIGS. 1 and 2. In this arrangement, the cross-sectional of the barrel wall 2 has a generally concave configuration. While a stack of at least four barrels is indicated in FIG. 2, it should be recognized that it is merely necessary to use a plurality of barrels. In other words, only two barrels can be used as indicated in FIG. 3 or any other suitable number of barrels can be used.

Figure 3:
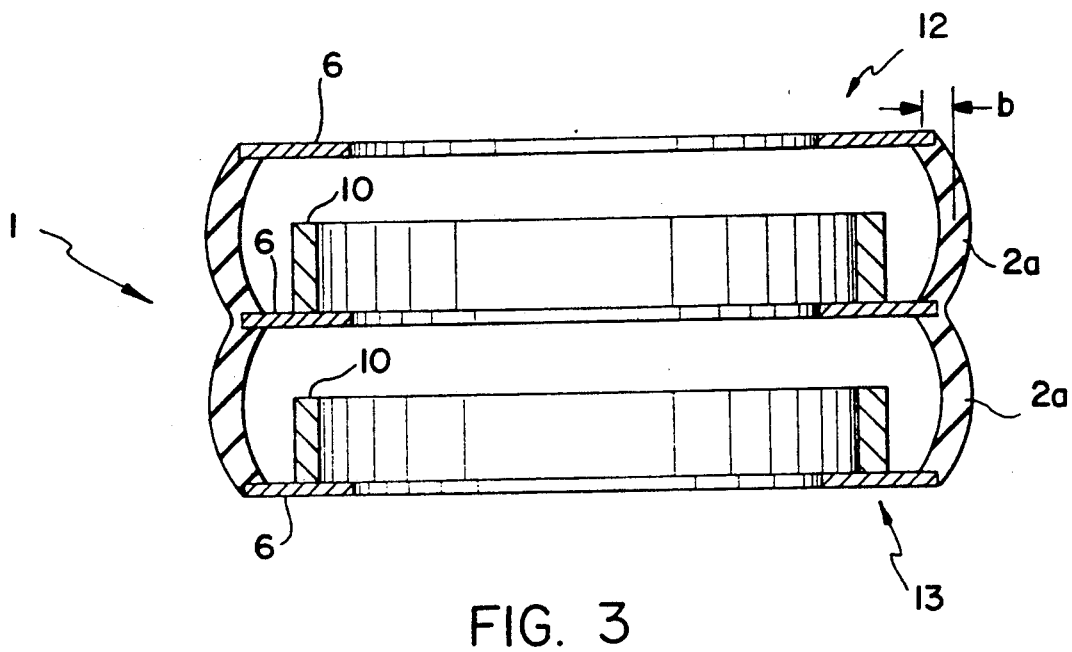
FIG. 3 is a side, cross-sectional view of a second embodiment of the energy absorbing system of the present invention.

In this FIG. 3, the cross-sectional of the sidewalls of each barrel 2a is generally convex. As a third arrangement, FIG. 4 indicates that the sidewalls of each barrel 2b can have a constant diameter inner wall and an outwardly bowed outer wall such that the mid-section of each barrel 2 is thicker. Accordingly, various cross-sectional configurations can be used for the barrels 2. However, the cross-sectional configuration shown in FIG. 2 is best in terms of energy absorption capabilities when compared to the configurations shown in FIGS. 3 and 4.

As seen in FIG. 2, the wall thickness of each barrel is indicated by (t), the curvature offset by (b), and the total length of energy absorbing system 1 by (L). The curvature offset (b) is an automatic consequence of the shrinkage of the stack of barrels after the system 1 has been cast. An integer (n) represents the number of barrels 2 while ($L_n$) (which equals the total length (L) of the system divided by the number (n) of barrels $L_n = L/n$) represents the length of one barrel. Further, (a) is the nominal radius of the system 1 while ($C_1$) and ($C_2$) are Mooney constants which describe the stress-displacement relationship of the urethane.

In the instant invention, the dimensionless curvature offset ($\bar{b}$) is defined by the following equation:

$$\bar{b} = b/t.$$

As further indicated in FIG. 2, ($t_d$) represents the thickness of one of the deformation limiter means 10. Each of the deformation limiters means 10 generally has the same thickness.

As previously discussed with regard to the deformation limiter means 10, total maximum displacement of the system 1 is represented by ($\Delta_{max}$) wherein:

$$\Delta_{max} = L - (n + 1)t_d - 2nt$$
(without deformation limiter means 10)
and
$$\Delta_{max} = L - (n + 1)t_d - nd$$
(with deformation limiter means 10)

where (d) equals the height of the deformation limiter means 10 as seen in FIG. 2. When this distance (d) is greater than two times the wall thickness (d > 2t), then:

$$\Delta'_{max} = \Delta_{max}/n$$

is the maximum displacement of each barrel.

The deformation limiter means 10 can have a height which is determined as a function of the desired maximum deformation. The height of the deformation limiter means 10 is, therefore:

$$d = L_n - \Delta'_{max} - (n+1)t_d/n.$$

In the instant system 1, it is important that the length of each barrel ($L_n$) divided by the nominal radius (a) of the system 1 is less than one as set forth in the following equation:

$$L_n/a < 1.$$

The ratio of wall thickness (t) and nominal radius (a) of the system should also approximately lie within the following limits:

$$0.07 \leq t/a \leq 0.12.$$

By utilizing this arrangement, the wall thickness to system length ratio can be kept relatively small. In other words, the total amount of material (urethane) can be kept to a minimum while an effective energy absorbing system is provided.

Accordingly, in the instant system 1 for a given maximum limiting force ($F_{limit}$), the total length (L) of the system and the total maximum displacement ($\Delta_{max}$) allow an energy absorbing design over a wide range of energy absorption values by selecting a suitable combination of number of barrels (n), wall thicknesses (t) and material constants ($C_1$) and ($C_2$). In addition, the system design provides for a very high energy absorption for a minimal use of material. The relation of several of the design parameters to the reaction force is given in FIG. 6. This FIG. 6 shows a typical force and energy absorption versus the total length (L) of the system 1 divided by the number (n) of barrels and the wall thickness (t) of a barrel as shown by the following formula:

$$L/(nt).$$

Figure 6:
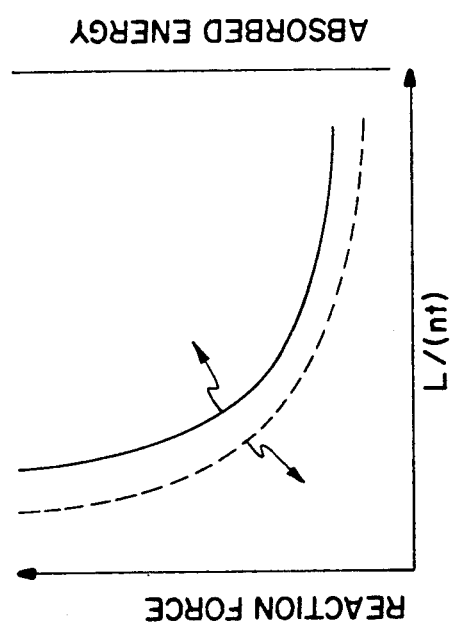
FIG. 6 is a graph illustrating typical force and energy absorption versus total system length (L) divided by the number of barrels (n) times the wall thickness of each barrel (t) of the present invention.

This graph of FIG. 6 is for given Mooney constants ($C_1$), ($C_2$) and displacement of the system ($\Delta_{max}$).

As merely an example, the following overall dimensions are given for a four-barrel model (n=4) which was tested. The overall length (L) of the four-barrel energy absorbing system was 30.7 cm, its nominal radius (a) was 15.625 cm and the wall thickness (t) of each barrel was 1.15 cm. The curvature offset (b) was 0.071 cm, which gives a dimensionless curvature offset ($\bar{b}$) of 0.062 (0.071 divided by 1.15). This was less than the critical dimensionless curvature ($\bar{b}_{cr}$), which was found from analysis to be 0.15. It should be readily apparent that the length of each barrel ($L_n$) is 7.625 cm (30.7 divided by 4) and, therefore, the ratio of the length of each barrel to the nominal radius is 0.491 (7.675 divided by 15.625) which is less than unity as it should be. Additionally the ratio of the wall thickness (t) and the nominal radius (a) is 0.0736 (1.15 divided by 15.625), which falls within the recommended range.

For the four-barrel test system, the thickness of the annular plate ($t_d$) was 0.32 cm and the height of the deformation limiters (d) was 3.44 cm. Consequently, it is found from a previously given formula that the maximum deflection of the four-barrel system ($\Delta_{max}$) is 15.35 cm (30.7 minus 5 times 0.32 minus 4 times 3.44), which corresponds to a 50% deformation. The maximum displacement of each barrel ($\Delta_{max}$) is 3.835 cm (15.35 divided by 4).

It should be recognized that while certain dimensions are given, variations should be obvious to those skilled in the art. Nonetheless, the principle should be maintained that the wall of each barrel is generally thin compared to the length thereof.

Figure 5:
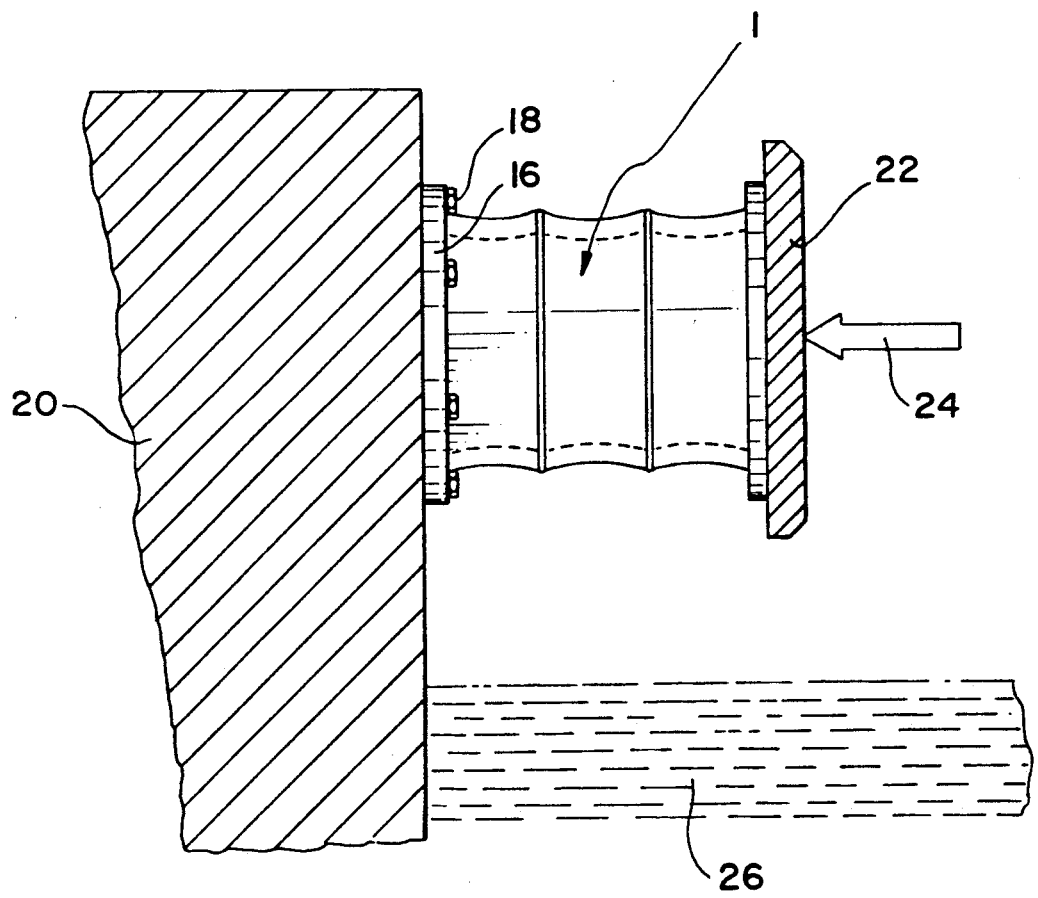
FIG. 5 is a side view of the energy absorbing system of the instant invention attached to a quay.

The instant energy absorbing system 1 can be used as a ship fendering system as indicated in FIG. 5. This system 1 may be attached to a quay 20 through a quay mounting plate 16. Bolts 18 are illustrated to affix this mounting plate 16 to quay 20. It should be recognized that any type of mounting arrangement can be used to affix the system 1 to a quay or other suitable structure. At the opposite end of the system 1 is a protective panel or contact plate 22. A resultant force indicated by arrow 24 will press against this contact plate 22. This force can arise from a docking ship moving through the water 26 engaging plate 22.

With the instant system 1, the n-barrel configuration can be thought of as n-springs in series. Since there are always slight manufacturing imperfections present, the barrels will not necessarily buckle simultaneously nor will they necessarily buckle in uniform sequence. For example, the next to the bottom barrel may first buckle and then the top barrel may buckle and then a middle barrel may buckle, et cetera. Alternatively, two or more barrels may first buckle and then a next single barrel or a next set of barrels may buckle. Any sequence of barrel buckling can take place with the instant energy absorbing system 1. The order of barrel buckling is dependent on the material properties of the individual barrels and is therefore selective. If the barrels could be made to ideally deform the same amount, they would buckle at the same instant and then continue to deform equally. Since this is not the case, the maximum percentage deflection of each barrel is limited to the maximum percentage deflection of the total length. Nonetheless, the order of buckling of the individual barrels 2 does not affect the performance of the fender.

When this limit is reached by a barrel or barrels 2, then the barrel(s) must be restrained from deflecting further. Therefore, the deformation limiting means 10 are provided. This limiting means will allow the barrels to only deflect a distance ($\Delta'_{max}$) as shown in FIG. 2. This distance ($\Delta'_{max}$) has been previously given as $$d = L_n - \Delta'_{max} - (n+1) t_d/n.$$

Figure 4:
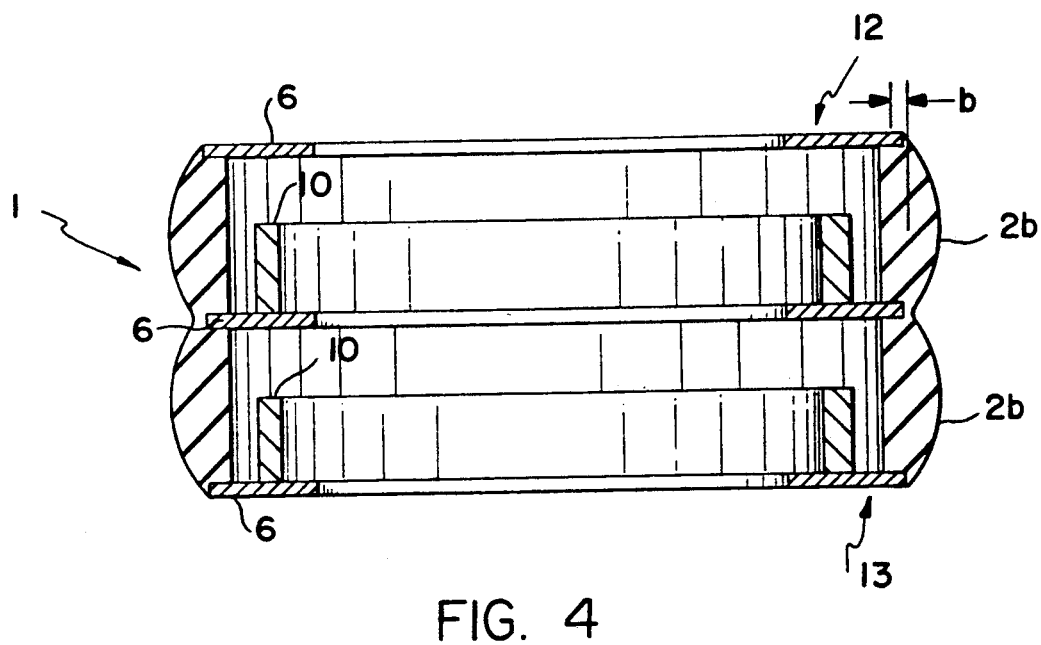
FIG. 4 is a side, cross-sectional view of a third embodiment of the energy absorbing system of the present invention.

By limiting further deflection of a barrel(s) 2, the load will be transferred to a subsequent barrel or set of barrels at which time this next barrel or set of barrels starts to deform until reaching a maximum percentage deflection. The spacing of the deformation limiter means 10 from the inside of the barrel wall can nominally be between (t/4) and (t/2) where (t) equals the wall thickness of each barrel 2 as indicated in FIG. 2. This is sufficient room to accommodate deflection of the barrel(s) 2 provided that ($\bar{b} \leq \bar{b}_{cr}$) in the configuration of FIG. 2, where ($\bar{b}$) is the curvature offset (b) divided by wall thickness (t) and ($\bar{b}_{cr}$) is an experimentally or analytically determined value. This value ($\bar{b}_{cr}$) is for one of two possible situations using the curvature offset (b) as shown in FIG. 2, 3 or 4. When ($\bar{b} < \bar{b}_{cr}$) the maximum radial deflection of the walls of each barrel will be outward, otherwise it will be inward. By using this spacing for the deformation limiter means from the inside of the barrel wall as shown in FIG. 2, the maximum inward radial displacement of the barrel walls will not come in contact with the limiter. In the other two configurations of FIGS. 2 and 3, the radial displacements will always be outward.

Figure 7:
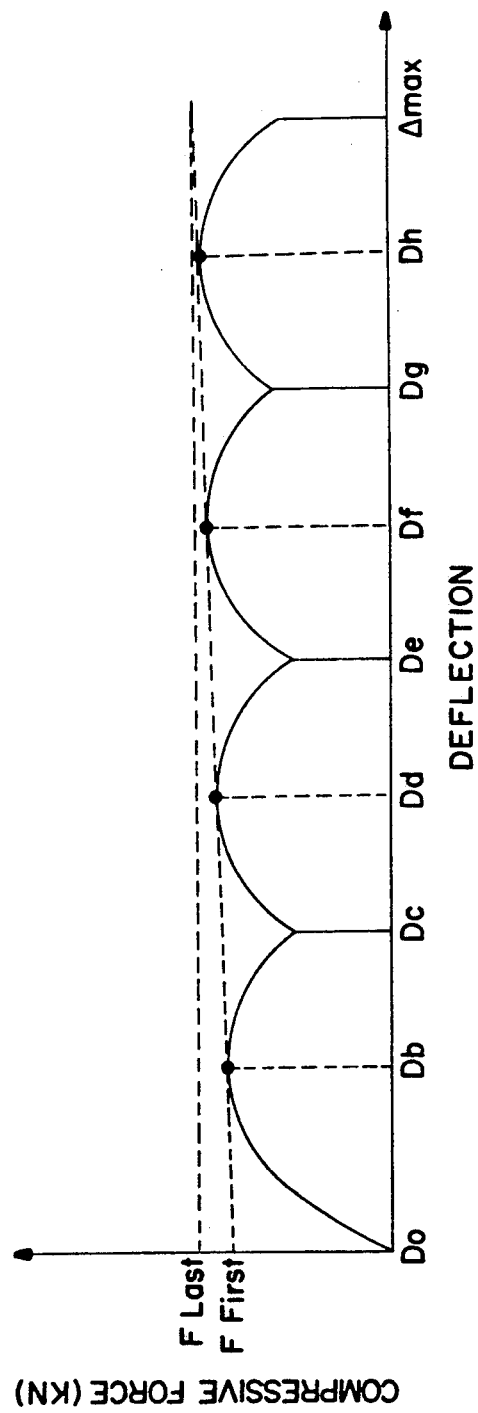
FIG. 7 is a graph illustrating the buckling force versus the deflection of the present energy absorbing system.

Referring now to FIG. 7, a compression force/deflection graph is indicated. Eventually, a maximal force ($F_{max}$) will be reached by the system 1 as indicated in FIG. 7. In FIG. 7, ($F_{last}$) = ($F_{max}$). At this force, the last barrel will begin to buckle.

As indicated in FIG. 7, a four-barrel absorbing system is shown. This arrangement is merely illustrative of a four-barrel arrangement while any number of barrels can be used in a stack. Moreover, in this arrangement, barrels individually buckle rather than sets of barrels or combinations of single barrels and sets of barrels. In FIG. 7, a first barrel begins receiving force at point ($D_o$) and will begin buckling from point ($D_b$) whereby a certain amount of energy is absorbed. There is a limit of force ($F_{first}$) which can be resisted by this first buckling barrel. This force is reached at deflection ($D_b$). When the deflection reaches a point ($D_c$), the deformation limiter means 10 will prevent further buckling of this first deforming barrel. A second barrel will then deform from point ($D_c$) through point ($D_d$) to point ($D_e$). Thereafter, the third and then fourth barrel will buckle as indicated through points ($D_f$), ($D_g$) and ($D_h$) to ($D_{max}$) provided sufficient force is applied to cause maximal deflection. While FIG. 7 is not to scale, it should be apparent that the distance from points ($D_o$) to ($D_c$) should generally equal the distance between segments ($D_c$) to ($D_e$) and ($D_e$) to ($D_g$) and ($D_g$) to ($D_{max}$).

While rigid deformation limiter means 10 such as rigid metal cylinders concentric with the cylinder's axis are contemplated, it should be understood that other materials can be used for the deformation limiter means 10. For example, rigid steel cylinders could be replaced by somewhat softer limiters in practice since steel limiters form a very stiff cylinder after the last barrel has been fully deflected, thereby creating an excessively high reaction force.

Accordingly, the instant energy absorbing system 1 provides for a buckling arrangement for absorbing a force. This arrangement is particularly useful in fendering a ship while avoiding damage thereto. While the instant system has been discussed as a system for fendering a ship, it should be recognized that this system can also be used with automobiles, trains or the like. In fact, the instant system can be used in many different situations which require absorption of a force.

Due to the thin wall configuration of each barrel 2, the overall amount of material required to manufacture the instant system 1 can be reduced. Therefore, cost can be kept low when manufacturing the instant energy absorbing system.

While urethane has been discussed as the primary material for manufacturing the instant energy absorbing system, it should be understood that other suitable types of material could be used. Also, the number of barrels which are used and their exact configuration can be varied as previously discussed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An energy absorbing system comprising means for absorbing a force by selectively buckling, the buckling means comprising a stack of elastic, thin walled barrels generally aligned along a common longitudinal axis, the stack having a first end and a second end, the first end being positioned on a fixed object and the second end receiving the force, elastic material forming the barrels being continuous from the first to the second end of the stack, a number (n) of barrels being used and the system further comprising deformation limiter means for allowing deflection of each barrel a maximum distance ($\Delta'_{max}$) during buckling and a plurality of plates for each of the barrels, each plate generally having a thickness ($t_d$), a plurality of deformation limiter means being provided, each of the barrels having one deformation limiter means having a height (d), the stack of barrels having a total length (L), maximum displacement of each barrel ($\Delta'_{max}$) being equal to a maximum displacement of the stack of barrels ($\Delta_{max}$) divided by a number (n) of barrels ($\Delta'_{max} = \Delta_{max}/n$) and wherein the maximum displacement of the stack of barrels ($\Delta_{max}$) satisfied the following equation:

$$\Delta_{max} = L - (n+1)t_d - nd.$$

2. The energy absorbing system as recited in claim 1, wherein each barrel generally has a wall thickness (t), a length ($L_n$) of each barrel generally being defined by the formula ($L_n = L/n$) and the stack of barrels having a generally circular shape with a nominal radius (a), the ratio of the length of a barrel relative to the nominal radius being less than one ($L_n/a < 1$).

3. The energy absorbing system as recited in claim 2, wherein the ratio of barrel wall thickness (t) to the nominal radius (a) satisfying the following equation:

$$0.08 \leq t/a \leq 0.12.$$

4. The energy absorbing system as recited in claim 1, wherein each barrel generally has a wall thickness (t) and the stack of barrels generally has a circular shape with a nominal radius (a), the ratio of barrel wall thickness (t) to the nominal radius (a) satisfying the following equation:

$$0.08 \leq t/a \leq 0.12.$$

5. The energy absorbing system as recited in claim 1, wherein the plurality of barrels are individually deflected a predetermined distance during buckling, and wherein the system is rated for a total amount of maximum force and when a force equal to the maximum force is absorbed, all of the barrels are deflected a maximum predetermined distance but when a force less than the maximum force is absorbed, at least some of the barrels are deflected less than the maximum predetermined distance.

6. The energy absorbing system as recited in claim 5, wherein the (n) barrels are used and wherein each barrel individually deflects the maximum distance ($\Delta'_{max}$) such that (n) times ($\Delta'_{max}$) equals the maximum predetermined deflection of the system ($\Delta_{max}$), the barrels being selectively buckled with the order of barrel buckling being dependent on actual geometric and material properties of each individual barrel.

7. The energy absorbing system as recited in claim 1, wherein each barrel generally has a wall thickness (t), maximum displacement of the stack of barrels satisfying the following equation:

$$\Delta_{max} = L - (n+1) t_d - 2nt.$$

8. The energy absorbing system as recited in claim 1, wherein each of the plurality of barrels has one of the plates therebetween and a plate is positioned at the first and second ends of the stack.

9. The energy absorbing system as recited in claim 8, wherein the plurality of plates each have a central opening defined therein with centers thereof being generally positioned along the common longitudinal axis.

10. The energy absorbing system as recited in claim 8, wherein the barrels are urethane and wherein a portion of the urethane covers an outer edge of each plate such that the plates are embedded in the urethane.

11. The energy absorbing system as recited in claim 1, wherein the fixed object is a ship docking structure and the force results from a ship moving toward and engaging the energy absorbing system, the system further comprising a contact plate mounted at the second end of the stack of barrels for engaging the ship.

12. The energy absorbing system as recited in claim 1, wherein each of the barrels have an inwardly curved configuration with a generally constant wall thickness before buckling thereof.

13. The energy absorbing system as recited in claim 1, wherein each of the barrels have an outwardly curved configuration with a generally constant wall thickness before buckling thereof.

14. The energy absorbing system as recited in claim 1, wherein each of the barrels have a generally flat inner surface and an outwardly bowed outer surface before buckling thereof such that the mid-section of each barrel is thicker than the ends thereof.

15. A marine fender assembly comprising a plurality of hollow elastic barrels which are generally longitudinally aligned, one end barrel of the aligned barrels being operatively attached to a ship docking structure and an opposite end barrel of the aligned barrels being operatively attached to a ship docking structure and an opposite end barrel of the aligned barrels having a face for contacting an object moving toward the ship docking structure, each of said barrels having a predetermined maximum wall thickness and a predetermined length with a ratio of wall thickness to length being less than 0.1, elastic material forming the barrels being continuous between the one end and opposite end of the stack, a number (n) of barrels being used and the system further comprising deformation limiter means for allowing deflection of each barrel a maximum distance ($\Delta'_{max}$) during buckling and a plurality of plates for each of the barrels, each plate generally having a thickness ($t_d$), a plurality of deformation limiter means being provided, each of the barrels having one deformation limiter means having a height (d), the stack of barrels having a total length (L), maximum displacement of each barrel ($\Delta'_{max}$) being equal to a maximum displacement of the stack of barrels ($\Delta_{max}$) divided by a number (n) of barrels ($\Delta'_{max} = \Delta_{max}/n$) and wherein the maximum displacement of the stack of barrels ($\Delta_{max}$) satisfied the following equation:

$$\Delta_{max} = L - (n+1)t_d - nd.$$

16. The marine fender assembly as recited in claim 15, wherein the barrels are urethane.

17. A marine fendering method comprising the steps of:

providing a plurality of hollow elastic barrels which are generally longitudinally aligned in a stack, the stack having a first end and a second end and elastic material forming the barrels being continuous between the first and second ends, each barrel having a deformation limiter having a height (d), and a number (n) of barrels being used;

affixing the first end of the stack to a ship docking structure;

moving a ship toward and engaging the second end of the stack;

buckling a first one of the barrels to thereby absorb at least a portion of the force;

buckling subsequent barrels of the stack if any force remains from the ship until all of the force is absorbed;

avoiding application of a force above a predetermined limit to the ship by the steps of buckling to thereby avoid damage to the ship;

limiting total deformation of each barrel during the steps of buckling by the deformation limiter, each barrel deflecting a maximum distance ($\Delta'_{max}$) during buckling;

providing a plurality of plates for each of the barrels, each plate generally having a thickness ($t_d$) and the stack of barrels having a total length (L); and satisfying the equations for maximum displacement of the stack of barrels ($\Delta_{max}$) being $\Delta_{max} = L - (n+1)t_d - nd$, and maximum displacement of each barrel ($\Delta_{max}$) being equal to the maximum displacement of the stack of barrels ($\Delta_{max}$) divided by the number (n) of barrels ($\Delta'_{max} = \Delta_{max}/n$).

18. The marine fendering method as recited in claim 17, further comprising the step of using urethane as material for the stack of barrels.

* * * * *